(12) United States Patent
Park

(10) Patent No.: US 10,557,981 B2
(45) Date of Patent: Feb. 11, 2020

(54) SURFACE LIGHTING APPARATUS AND METHOD FOR MANUFACTURING THE SAME

(71) Applicant: KOLON GLOTECH, INC., Gwacheon (KR)

(72) Inventor: Byoung Cheul Park, Seosan (KR)

(73) Assignee: KOLON GLOTECH, INC., Gwacheon (KR)

( * ) Notice: Subject to any disclaimer, the term of this patent is extended or adjusted under 35 U.S.C. 154(b) by 55 days.

(21) Appl. No.: 15/446,674

(22) Filed: Mar. 1, 2017

(65) Prior Publication Data

US 2018/0164486 A1    Jun. 14, 2018

(30) Foreign Application Priority Data

Dec. 12, 2016    (KR) .................... 10-2016-0168751

(51) Int. Cl.
*F21V 8/00*    (2006.01)

(52) U.S. Cl.
CPC ............ *G02B 6/0025* (2013.01); *G02B 6/009* (2013.01); *G02B 6/0036* (2013.01);
(Continued)

(58) Field of Classification Search
CPC .......... G02B 1/105; G02B 1/11; G02B 1/115; G02B 1/14; G02B 1/16; G02B 1/18; G02B 5/04; G02B 286/0031; G02B 5/0036; G02B 5/005; G02B 5/0053; G02B 5/0025; G02B 5/0065; G02B 5/0055; G02B 5/0051; G02B 5/009; G02B 5/045; G02B 6/0031; G02B 6/0036; G02B 6/005; G02B 6/0053; G02B 6/0025; G02B 6/0065; G02B 6/0055;
(Continued)

(56) References Cited

U.S. PATENT DOCUMENTS 8,613,541 B2    12/2013  Yu et al.
2004/0207822 A1*  10/2004  Lee .................... G02B 27/0994
                                                                 353/98

(Continued)

FOREIGN PATENT DOCUMENTS

JP        2001166296 A   *   6/2001
JP         201449417 A       3/2014
(Continued)

OTHER PUBLICATIONS

Espacenet English translation of reference JP 2001166296 A.*

*Primary Examiner* — William J Carter
*Assistant Examiner* — Omar Rojas Cadima

(57) ABSTRACT

Disclosed herein is a surface lighting apparatus. According to the present invention, the surface lighting apparatus comprises a light guiding unit for dispersing light input from light source through patterns formed in the light guiding unit, a reflecting unit formed at a lower part of the light guiding unit to reflect light being out among dispersed light of the light guiding unit, a diffusing unit adjoining an upper part of the light guiding unit and scattering light dispersed from the light guiding unit, and a refract guiding unit formed between the light source and the light guiding unit and concentrating total light input by refracting at least a part of light input from the light source to guide the light to the light guiding unit.

16 Claims, 8 Drawing Sheets

(52) U.S. Cl.
CPC .......... *G02B 6/0051* (2013.01); *G02B 6/0055* (2013.01); *G02B 6/0065* (2013.01)

(58) Field of Classification Search
CPC . G02B 6/0051; G02B 6/009; G02F 1/133553; G02F 1/133555; G02F 1/133605; G02F 2001/133557
USPC ........ 362/608, 609, 610, 618, 624, 626, 630
See application file for complete search history.

(56) References Cited

U.S. PATENT DOCUMENTS

| | | | |
|---|---|---|---|
| 2007/0008457 A1* | 1/2007 | Takahashi | G02B 6/0018 349/64 |
| 2007/0081360 A1* | 4/2007 | Bailey | G02B 6/0021 362/621 |
| 2008/0089654 A1* | 4/2008 | Lee | G02B 6/0096 385/133 |
| 2012/0113354 A1* | 5/2012 | Park | G02F 1/133606 349/62 |
| 2013/0027908 A1* | 1/2013 | Yu | 362/97.2 |
| 2014/0346370 A1* | 11/2014 | Dobrinsky | A61L 2/10 250/433 |
| 2017/0139088 A1* | 5/2017 | Iki | G02B 5/0242 |

FOREIGN PATENT DOCUMENTS

| | | | |
|---|---|---|---|
| KR | 20070071081 A * | 7/2007 | |
| KR | 1020070071081 A | 7/2007 | |
| KR | 1020160084009 A | 7/2016 | |
| KR | 101656461 B1 | 9/2016 | |
| KR | 10-2016-0124285 A | 10/2016 | |

\* cited by examiner

[FIG. 1]
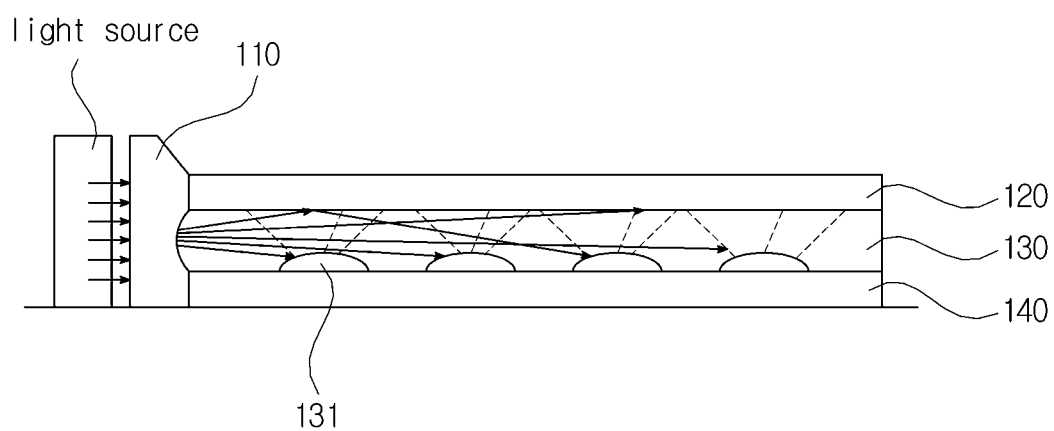

[FIG 2A]
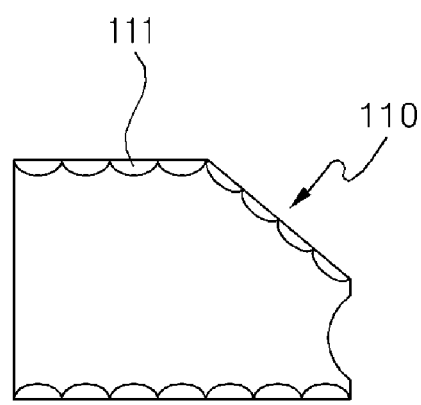
[FIG 2B]
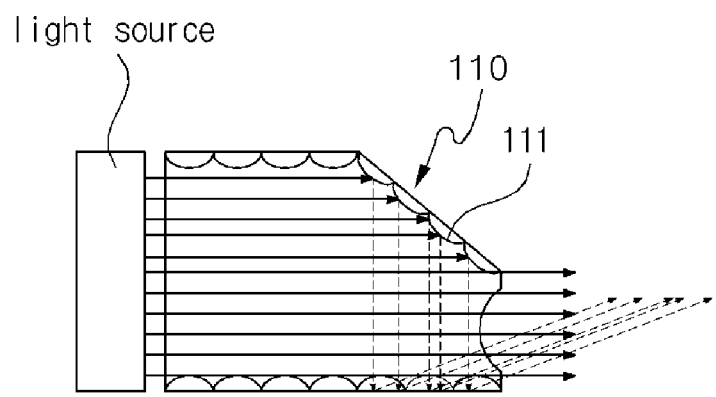

[FIG 2C]
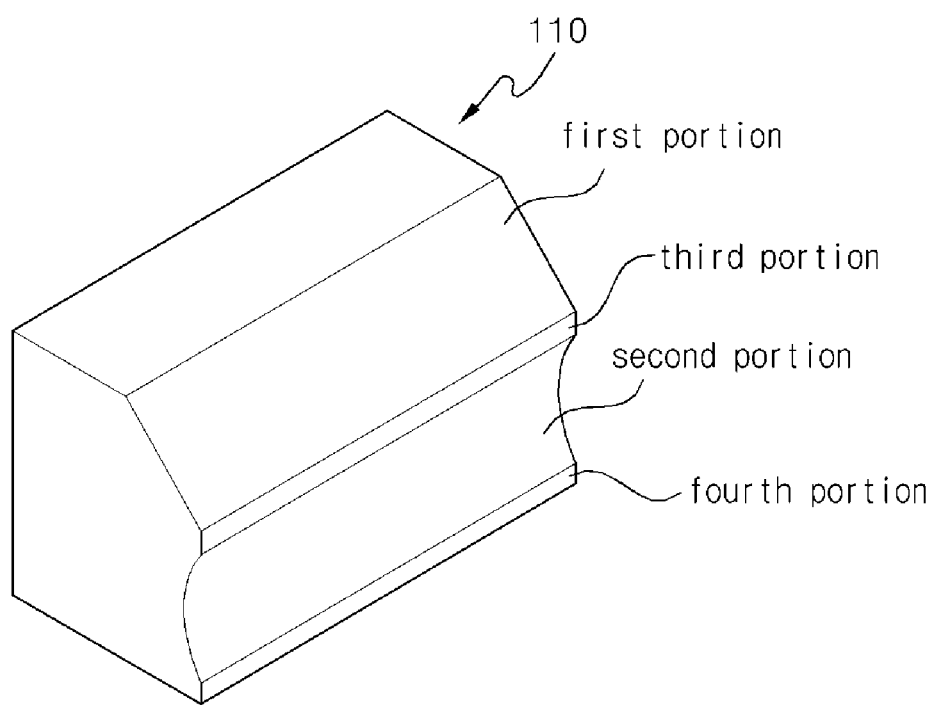

[FIG. 3]
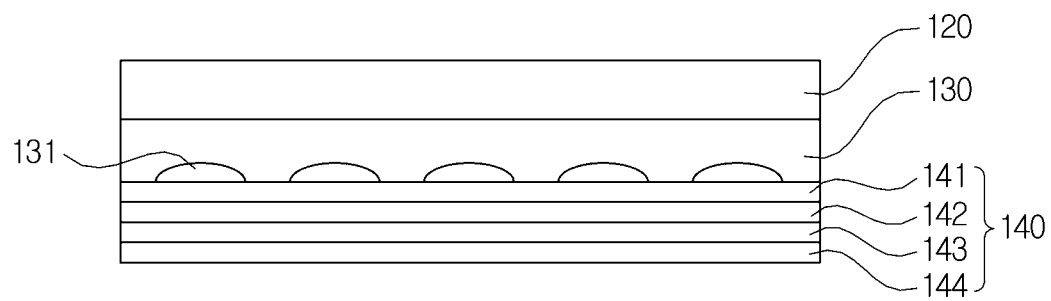

[FIG. 4]
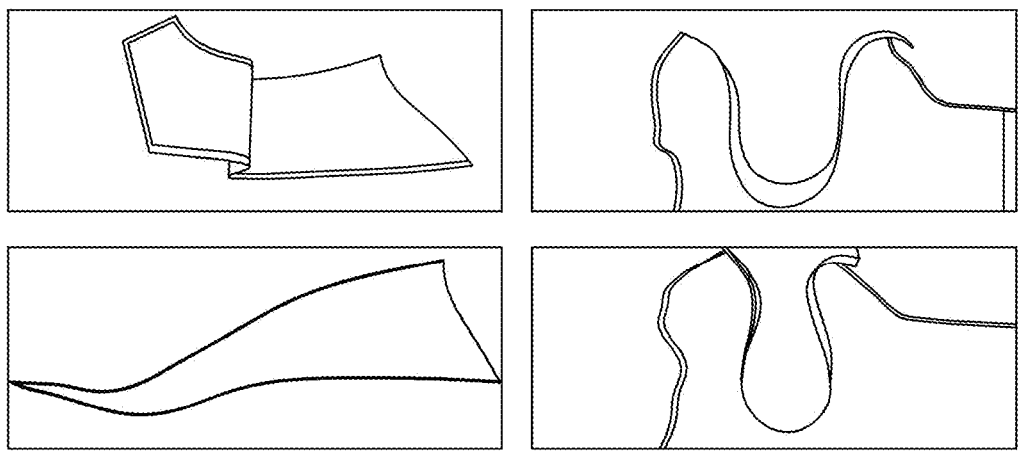

[FIG. 5]
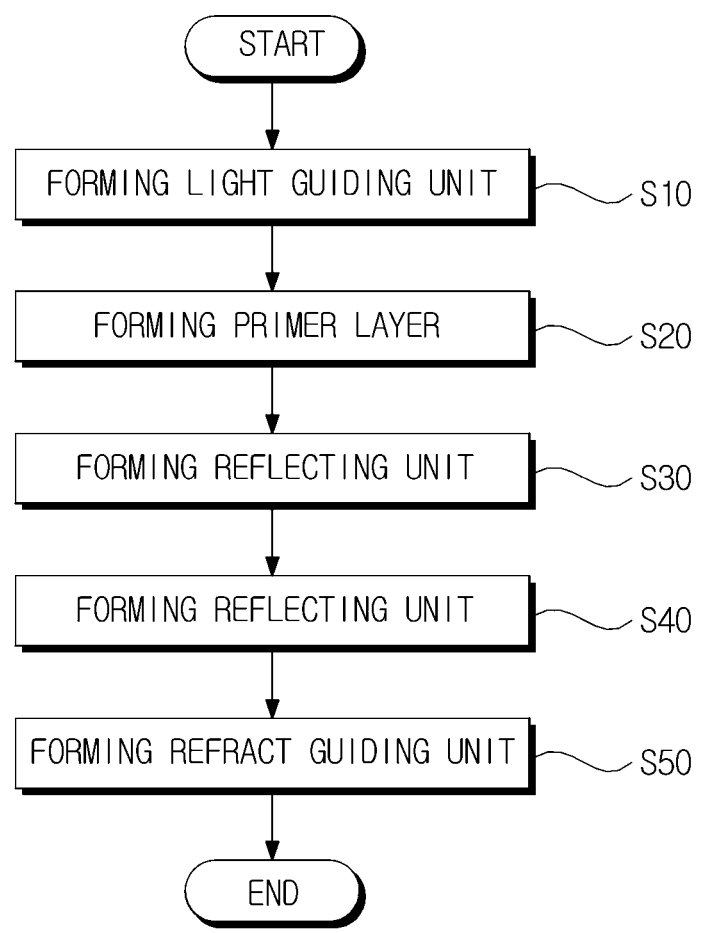

[FIG. 6]
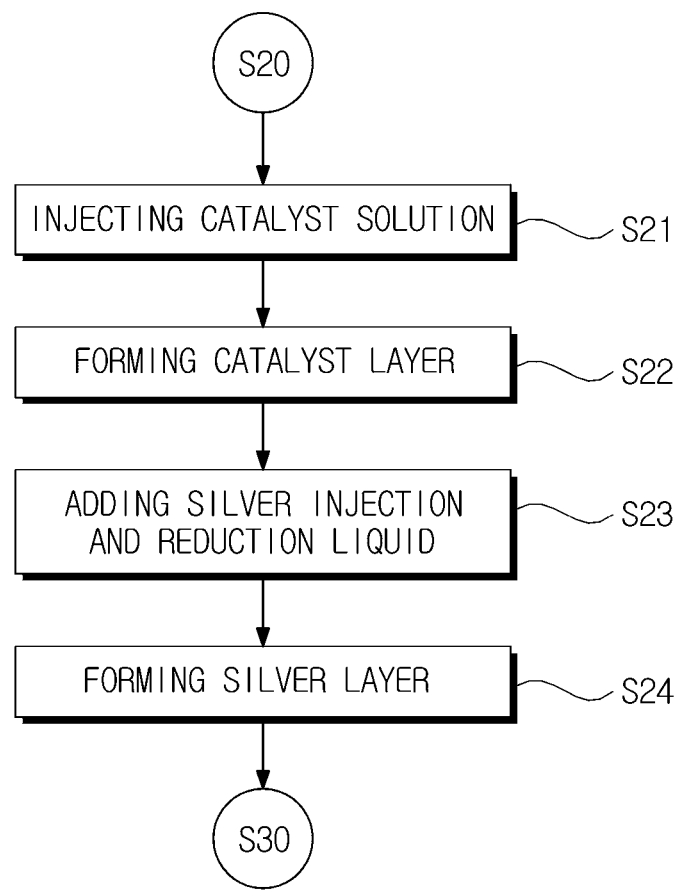

[FIG. 7]
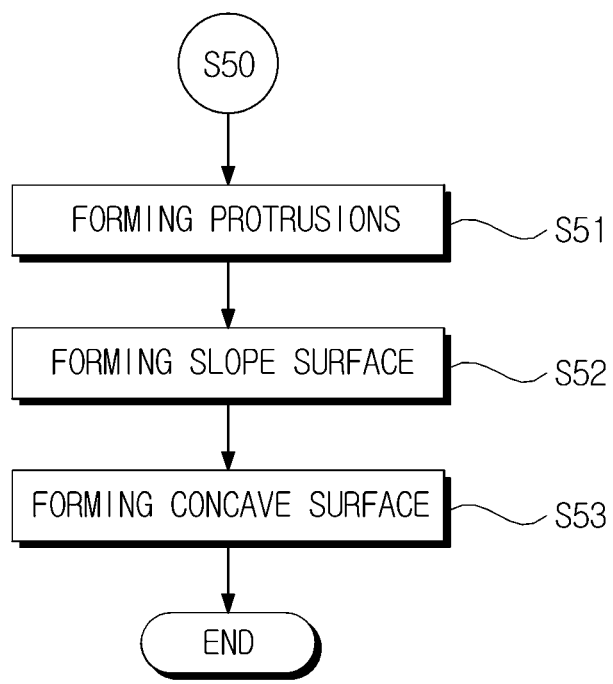

SURFACE LIGHTING APPARATUS AND METHOD FOR MANUFACTURING THE SAME

CROSS-REFERENCE TO RELATED APPLICATIONS

This application claims priority to and the benefit of Korean Patent Application No. 10-2016-0168751 filed in the Korean Intellectual Property Office on Dec. 12, 2016, the entire contents of which are incorporated herein by reference.

TECHNICAL FIELD

The present invention relates to a surface lighting apparatus and a method for manufacturing the same, in particularly, a surface lighting apparatus formed without additional adhesion layers in one entity and having thin thickness and a method for manufacturing the same.

BACKGROUND ART

In order to improve light efficiency, illumination units have been manufactured using various and proper light sources according to properties of electronic devices in the field of electronic devices.

Recently, the illumination units are variously applicable to backlight units applied to flat displays, interior lights, automotive exterior lightings such as headlight, fog light, backup light, side light, number-plate lamp, tail lamp, stop lamp, turn signal lamp, and hazard lamp, and automotive interior lightings.

However, these conventional illumination lights have disadvantage of low flexibility of Back Light Unit (BLU) due to PMMA material thereof having 1 mm or more thickness. Also, in the event that illumination units are installed in a large area, it is impossible for them to have flexibility since they should have light sources at four sides.

Therefore, a method all-in-one surface light devices for manufacturing surface lights having high efficiency and a thickness being 1 mm and less is provided.

SUMMARY OF THE INVENTION

One or more exemplary embodiments overcome the above disadvantages and other disadvantages not described above. However, one or more embodiments are not required to overcome the disadvantages described above, and an exemplary embodiment may not overcome any of the problems described above.

One or more embodiments provide a surface lighting apparatus formed without additional adhesion layers in one entity and having thin thickness and a method for manufacturing the same. As a result, it is possible to secure productivity, emit constant light amount from a different angle, and be capable of preventing glaring through flexible surface lighting apparatus.

According to an aspect of one or more embodiments, a surface lighting apparatus comprises a light guiding unit for dispersing light input from light source through patterns formed in the light guiding unit, a reflecting unit formed at a lower part of the light guiding unit to reflect light being out among dispersed light of the light guiding unit, a diffusing unit adjoining an upper part of the light guiding unit and scattering light dispersed from the light guiding unit, and a refract guiding unit formed between the light source and the light guiding unit and concentrating total light input by refracting at least a part of light input from the light source to guide the light to the light guiding unit.

In an aspect of one or more embodiments, the refract guiding unit adjoins the light guiding unit to refract light input from the light source and at least one surface of the refract guiding unit has a slope at a predetermined angle with respect to horizontal plane.

In an aspect of one or more embodiments, one side of the refract guiding unit adjoining the light guiding unit is formed concavely for concentrating the total light input from the light source to guide the light to the light guiding unit.

In an aspect of one or more embodiments, the refract guiding unit refracts at least a part of the input light from the light source in a vertical direction using protrusions formed on at least part of an inner surface of the refract guiding unit. The refract guiding unit refracts a part of the vertically refracted light to the other surface by the protrusions formed on a lower inner surface again to guide the light to the light guiding unit.

In an aspect of one or more embodiments, one side of the refract guiding unit adjoining the light guiding unit comprises a first side being in a slope-shaped and inclined to refract a part of input light from the light source in a vertical direction, and a second side formed concavely in a light source direction.

In an aspect of one or more embodiments, the reflecting unit further comprises a catalyst layer formed using metallic salts, and a silver layer formed using silver injection and reduction liquid on one side of the catalyst layer.

In an aspect of one or more embodiments, the reflecting unit further comprises a primer layer for enhancing interfacial adhesion with the catalyst layer.

In an aspect of one or more embodiments, a wet reflecting layer is formed by silver mirror reaction on one side of the reflecting unit.

In an aspect of one or more embodiments, a thickness of the primer layer is thicker than a thickness of patterns of the light guiding unit.

In an aspect of one or more embodiments, the diffusing unit further comprises a diffusion coating layer of low refractive index for lowering refractive index using transparent polymer resin and inorganic substance of low refractive index to upward path of light radiated from the light guiding unit.

In an aspect of one or more embodiments, FPCB with a light-source module adjoining one surface of the refract guiding unit to include a multiplicity of light sources is further included.

According to another aspect of one or more embodiments, a method for manufacturing a surface lighting apparatus comprises forming a light guiding unit for dispersing light input from light source through patterns formed in the light guiding unit, forming a reflecting unit formed at a lower part of the light guiding unit to reflect light being out among dispersed light of the light guiding unit, forming a diffusing unit adjoining an upper part of the light guiding unit and scattering light dispersed from the light guiding unit, and forming a refract guiding unit formed between the light source and the light guiding unit and concentrating total light input by refracting at least a part of light input from the light source to guide the light to the light guiding unit.

In an aspect of one or more embodiments, forming the refract guiding unit further comprises refracting at least a part of the input light from the light source in a vertical direction using protrusions formed on at least part of an inner surface of the refract guiding unit.

In an aspect of one or more embodiments, in forming the refract guiding unit, at least one surface of the refract guiding unit has a slope inclined at a predetermined angle with respect to horizontal plane.

In an aspect of one or more embodiments, in forming the refract guiding unit, one side of the refract guiding unit adjoining the light guiding unit is formed concavely for concentrating the total light input from the light source to guide the light to the light guiding unit.

In an aspect of one or more embodiments, forming the reflecting unit further comprises forming a catalyst layer formed using metallic salts, and forming a silver layer formed using silver injection and reduction liquid on one side of the catalyst layer.

In an aspect of one or more embodiments, forming the reflecting unit further comprises forming a primer layer for enhancing interfacial adhesion with the catalyst layer.

In an aspect of one or more embodiments, one side of the refract guiding unit adjoining the light guiding unit comprises a first side being in a slope-shaped and inclined to refract a part of input light from the light source in a vertical direction and a second side formed concavely in a light source direction.

In an aspect of one or more embodiments, forming FPCB with a light-source module adjoining one surface of the refract guiding unit to include a multiplicity of light sources is further included.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a view schematically showing a surface lighting apparatus according to an embodiment of the present invention;

FIG. 2A is a is a view schematically showing a refract guiding unit according to an embodiment of the present invention;

FIG. 2B is a is a view schematically showing a refract guiding unit according to an embodiment of the present invention;

FIG. 2C is a is a view schematically showing a refract guiding unit according to an embodiment of the present invention;

FIG. 3 is a view concretely showing a reflecting unit according to an embodiment of the present invention;

FIG. 4 is a view showing light extraction efficiency depending on weather a diffusing unit is formed according to an embodiment of the present invention;

FIG. 5 is a flowchart explaining a method for manufacturing a surface lighting device according to an embodiment of the present invention;

FIG. 6 is a flowchart explaining a concrete step between S20 and S30 of FIG. 5; and FIG. 7 is a flowchart explaining a step after S50.

DETAILED DESCRIPTION

Exemplary embodiments are described in greater detail below with reference to the accompanying drawings.

While this invention has been described in connection with what is presently considered to be the practical and preferred embodiments, it is to be understood that the invention is not limited to the disclosed embodiment, but, on the contrary, is intended to cover various modifications and equivalent arrangements included within the scope of the invention.

The terms "first", "second", etc. may be used to describe diverse components, but the components are not limited by the terms. The terms are only used to distinguish one component from the others.

The terms used in this disclosure are only used to describe exemplary embodiments, but are not intended to limit the scope of the disclosure. The singular expression also includes the plural meaning as long as it does not differently mean in the context. In the present application, the terms "include" and "consist of" designate the presence of features, numbers, steps, operations, components, elements, or a combination thereof that are written in the specification, but do not exclude the presence or possibility of addition of one or more other features, numbers, steps, operations, components, elements, or a combination thereof.

Further, in the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

In the drawings, the thickness of layers and regions are exaggerated for clarity. It will be understood that when an element or layer is referred to as being "on" or "above" another element or layer, the element or layer may be directly on another element or layer or intervening elements or layers. Like numbers refer to like elements throughout the specification.

Hereinafter, a surface lighting apparatus may be formed of various elements. The invention has been described using an exemplary necessary elements. However, it is to be understood that the scope of the invention is not limited.

A surface lighting apparatus of the present invention comprises a light guiding unit, a reflecting unit, a diffusing unit, and a refract guiding unit. The light guiding unit, the reflecting unit, and the diffusing unit are formed without additional adhesion in one entity. The diffusing unit has thin thickness. The refract guiding unit corrects thickness difference between the light guiding unit and reflecting unit, and light source. As a result, it is possible to apply high efficiency light source to the light guiding unit having thin thickness.

In addition, the surface lighting apparatus of the present invention may be a lighting unit including a backlight unit, which comprises a liquid crystal panel formed in the most upper layer, a LED substrate having a plurality of LEDs, and an optical sheet formed of at least one prism sheet.

FIG. 1 is a view schematically showing a surface lighting device according to an embodiment of the present invention.

The surface lighting unit 100 according to an embodiment of the present invention comprises a refract guiding unit 110, a diffusing unit 120, a light guiding unit 130, and a reflecting unit 140.

In this case, each of the elements of the surface lighting apparatus 100 is not a stacked structure of different films but is formed in one entity.

The surface lighting unit 100 according to another embodiment of the present invention further comprises light source.

The light source is arranged around corners or lateral side of incoming light of the light guiding unit 130. That is, the light source emits light towards the corners or lateral side of incoming light. The light source is at least one or more LEDs or LED chips. For example, the light source is gallium nitride based LED. The number of light sources have various values considering size of a display panel and brightness uniformity.

In this case, it is preferable that the light source has 1.0 T or more thickness for high efficiency. Only when the light guiding unit 130 with one or more 1.0 T thickness to apply this light source, light efficiency can be maximized. However, the light guiding unit 130 with one or more 1.0 T thickness has a limitation with respect to flexibility and disadvantageous of low design freedom due to bending radius of one or more 40 mm.

Accordingly, the light guiding unit having thin thickness as compared to the thickness of the light source for enhancing flexibility, and a slope is formed in the refract guiding unit 110 for correction thickness difference between the light guiding unit and light source. In more detail, at least one part of surface of the refract guiding unit 110 is formed in a slope-shaped, which is inclined at a predetermined angle with respect to horizontal plate.

In other words, it is preferable that the slope of the refract guiding unit 110 have an angle ranged from 5° to 30° with respect to horizontal plate. If the angle of the slope is over 30°, condensing effect can be reduced.

The refract guiding unit 110 according to an embodiment of the present invention is formed of materials having excellent light transmittance and flexibility. The refract guiding unit 110 is formed of at least one selected from the group consisting of urethane, acryl, PC, PE, PI, PP, PS, PU, PET, PEN, and PAN, which is maintained in its shape and has flexibility after transformation by heating and pressing. For instance, the refract guiding unit 110 is separately processed by heating and pressing processes within preset frame, under the condition that the light source is arranged. Thus, existing process of the light guiding unit can be selected and applied.

The refract guiding unit 110 according to an embodiment of the present invention is formed between the light source and the light guiding unit 130. The refract guiding unit 110 concentrates total light input by refracting at least a part of light input from the light source and guides it to the light guiding unit 130.

In addition, to concentrate total light input from the light source, one surface the refract guiding unit 110 according to an embodiment of the present invention closing to the light guiding unit 130 is formed concavely toward inner direction thereof.

Referring to FIG. 2, the present invention will be explained in more detail.

FIG. 2 is a view schematically showing a refract guiding unit according to an embodiment of the present invention.

Referring to FIG. 2(a), the refract guiding unit 110 of the present invention refracts at least a part of light input from the light source in a vertical direction using protrusions 111 of at least a part of inner surfaces. That is, as shown in FIG. 2(a), upper protrusions 111 makes light input to an upper part of the refract guiding unit 110 downward. One surface closing to the refract guiding unit 110 improves straight-ability of light through concave shape, thereby maximizing light input from the light guiding unit 130.

That is, as shown in FIG. 2(b), the refract guiding unit 110 receives light emitted from the light source locate in one side thereof and concentrates light, thereby guiding it to the light guiding unit. At this time, a part of light emitted from the light source goes to the other side concaved to inner direction of the refract guiding unit 110. A part of light emitted from the light reaches a slope in one side of the refract guiding unit 110 and is refracted in a vertical direction with respect to the protrusions 111 formed in the slope. As a result, the refracted light is refracted to the other side of the refract guiding unit 110 by the protrusions 111 which are formed in lower inner sides of the refract guiding unit 110 to be guided to the light guiding unit 130.

Through scattering by the protrusions 111 formed in a part of inner surfaces of the refract guiding unit 110, light becomes scattered and diffusedly reflected, so that light is collected in a region in which the protrusions 111 are not formed. Accordingly, light goes to one side of the refract guiding unit 110 closing to the light guiding unit 130.

In this case, one side of the refract guiding unit 130 formed concavely to an inner direction thereof makes straight-ability of light input from the light source enhance to concentrate it.

FIG. 2(c) is a perspective view of a refract guiding unit.

The diffusing unit 120 is adjacent to an upper part of the light guiding unit 130 and capable of scattering light, which is diffused and escape from the light guiding unit 130.

As an example, the diffusing unit 120 further includes a low refractive-index diffusion coating layer using transparent polymer resin and low refractive-index inorganic particle to making light path irradiated from the light guiding unit 130 upward. The low refractive-index diffusion coating layer is capable of lowering refractive index of light input from the light guiding unit 130 and making refractive-index differences with the light guiding unit 130 large. As a result, the light path of light input from the light guiding unit 130 becomes upward to be concentrated and diffused.

As mentioned above, to maintain low refractive-index property of coating solution for forming the diffusing unit 140, low refractive-index inorganic particle is added to transparent polymer resin. More preferably, porous silica powder, hollow silica powder, or MgF2 particulate powder is mixed with UV-curable coating solution.

At this time, it is preferable that refractive ray index of light of transparent polymer resin is ranged from 1.4 to 1.5. Low refractive-index particles are mixed with porous silica powder having refractive index ranged from 1.1 to 1.4, hollow silica powder, or MgF2 to be coated, thereby lowering refractive index as well as scattering and diffusing light. Thus, the light path of light input from the light guiding unit 130 having refractive index ranged from 1.5 to 1.6 can be refracted upwardly.

In employing porous silica powder, hollow silica powder, or MgF2, particle size is preferably ranged from 0.01 μm to 0.05 μm. In case that materials having particle size ranged from 0.01 μm to 0.05 μm are used, refractive index of light is ranged from 1.3 to 1.38. Therefore, if the materials are mixed with transparent organic resin to be coated, it is possible to reduce refract index as well as create diffusion effect by refractive difference of porous silica powder, hollow silica powder, MgF2, and transparent UV-curable resin.

The diffusing unit 120 according to another embodiment of the present invention is formed to be mixed and coated with the above-mentioned powers as well as inorganic matter to particulate powder thereof, which lowers refractive index.

Transparent inorganic thin film coating layer according to an embodiment of the present invention is metal oxide, metal nitride, and metal fluoride. In more detail, various kinds of thin films such as SiO2 (1.46), Al2O3 (1.7), TiO2 (2.45), Ta2O5 (2.2), ZrO2 (2.05), HfO2 (2.0), Nb2O5 (2.33), Si3N4 (2.02), MgF2 (1.38) are coated through sputtering, E beam Evaporation, or PECVD. Also, the transparent inorganic thin film coating layer is coated in a single layer or a stacked layer.

Referring to FIG. 1 again, the light guiding unit 130 scatters light input from the light source through patterns 131 formed therein.

To efficiently guide light input from the refractive guiding unit 110, the light guiding unit 130 prepares patterns 131 through stamping or printing depending on area. In this case, the thickness of the patterns 131 is preferably ranged from 3 μm to 10 μm. The patterns 131 through stamping is formed in intaglio, and the patterns 131 through printing is formed in relief.

The reflecting unit 140 according to an embodiment of the present invention is formed in a lower part of the light guiding unit 130 to reflect light going to outside among scattered from the light guiding unit 130.

Referring to FIG. 3, the reflecting unit 140 of the present invention will be described in more detail.

FIG. 3 is a view concretely showing a reflecting unit according to an embodiment of the present invention.

Referring to FIG. 3, the reflecting unit 140 of the present invention further includes a primer layer 141, a catalyst layer 142, a silver layer 143, and a protective coating layer 144.

The primer layer 141 according to an embodiment of the present invention 141 is capable of enhancing interfacial adhesion with the catalyst layer 142. In this case, the primer layer 141 planarizes concave and convex substrate by the patterns formed by the light guiding unit 130 and maximizes interfacial adhesion with the reflecting unit 140.

In other words, the thickness of the primer layer 141 is preferably ranged from 0.1 μm to 10 μm. More preferably, the thickness of the primer layer 141 is thicker than that of the patterns of the light guiding unit 130. If the thickness of the primer layer 141 is thinner than that of patterns, curves of the patterns are not completely covered so that smoothness becomes reduced. Due to the reduced smoothness, a layer that will be stacked is not evenly coated, thereby reducing reflectivity.

In addition, the primer layer 141 is formed of UV-curable material or heat curable material. For enhancing reflectivity, it is preferable that the primer layer 141 is formed of UV-curable material. For enhancing adhesion, it is preferable that the primer layer 141 is formed of heat curable material.

The primer layer 141 according to another embodiment of the present invention further includes a wet reflecting layer through silver mirror reaction. The silver mirror reaction is a kind of plating reaction by precipitation through oxidation and reduction, and employs catalyst for quickly forming the catalyst layer at room temperature.

The catalyst layer 142 according to an embodiment of the present invention is formed using metallic salts. In more detail, the catalyst layer 142 catalyzes one surface of the primer layer 141 using aqueous catalyst solution formed of metallic salts or a mixture of at least two kinds of metallic salts. As a result, the velocity of silver mirror reaction is accelerated, and silver mirror reaction can be performed at low temperature.

In this case, various metallic salts such as Fe-based salts, Al-based salts, Zn-based salts and the like are used as catalyst. At this time, metallic salts are dissolved and sprayed to be coated. In case that wetting condition is poor, it is preferable that a small amount of surfactant is added in coating.

After that, the reflecting unit 140 further includes a silver layer 143 formed using silver injection and reduction liquid on one surface of the catalyst layer 142. In this case, the silver injection is formed by containing salts having the same silver ion as silver nitrate and an amount of aqueous ammonia. That is, the reduction liquid in the present invention is capable of deoxidizing silver using formaldehyde, acetaldehyde, sodium (Na+), potassium (K+), organic bases, and amine-based compounds as main component. At this time, it should be understood that the reduction liquids capable of deoxidizing silver are applicable and not limited to the above-mentioned compounds. For example, NaOH, KOH, and reducing sugar are applicable. The deposition and purity of silver depend on concentration and variety.

The present invention is advantageous of gloss, high reflectivity, and elegant appearance. Overcoming disadvantages such that silver becomes easily discolored in contact with various kinds of active gases in air, surfaces are treated using inorganic-based (silica base and the thickness thereof is 5 μm) coating solutions having enough sealing in a coating thickness, thereby preventing the reflecting unit 140 exposed outside for a long time from be discolored.

The reflectivity of the above-mentioned reflecting unit 140 is 95% and more finally in full-wavelength region.

FIG. 4 is a view showing light extraction efficiency depending on weather a diffusing unit is formed according to an embodiment of the present invention.

FIG. 5 is a flowchart explaining a method for manufacturing a surface lighting device according to an embodiment of the present invention. FIG. 6 is a flowchart explaining a concrete step between S20 and S30 of FIG. 5. FIG. 7 is a flowchart explaining a step after S50.

In accordance with the method for manufacturing the surface lighting device, a light guiding unit 130 for dispersing light input from light source through patterns formed in the light guiding unit is formed (S10).

Next, a primer layer 141 planarizing concave and convex substrate by the patterns formed by the light guiding unit 130 and maximizes interfacial adhesion with a reflecting unit 140 is formed (S20).

After forming the primer layer, the reflecting unit 140 formed at a lower part of the light guiding unit 130 to reflect light being out among dispersed light of the light guiding unit 130 is formed (S30).

In this case, the reflecting unit 140 according to an embodiment of the present invention can be formed separately and with the primer layer. Each of the above-mentioned structure is not separately stacked but is formed in one entity in which role and function thereof are separated.

Next, a diffusing unit 140 adjoining an upper part of the light guiding unit 130 and scattering light dispersed from the light guiding unit 130 is formed (S40).

After the diffusing unit 140, a refract guiding unit 110 formed between the light source and the light guiding unit 130 and concentrating total light input by refracting at least a part of light input from the light source to guide the light to the light guiding unit 130 (S50).

Referring to FIG. 6, after forming the primer layer (S20), the catalyst layer 142 sprays aqueous catalyst solution formed of metallic salts or a mixture of at least two kinds of metallic salts on one surface of the primer layer 141 (S21). In case that wetting condition is poor on a surface in which the aqueous catalyst solution is sprayed, it is preferable that a small amount of surfactant is added in coating as occasion demands.

After forming the catalyst layer (S22), silver injection and reduction liquid are added on one surface of the catalyst layer (S23).

Through the above-mentioned process, the reflecting unit 140 forms a silver layer (S24).

Next, referring to FIG. 7, a refract guiding unit 110 includes protrusions 111 formed on at least part of an inner surface of the refract guiding unit 110 (S51). The protrusions is capable of refracting at least a part of the input light from the light source in a vertical direction. For instance, upper protrusions 111 of the refract guiding unit 110 makes light input to an upper part of the refract guiding unit 110 downward.

Next, the refract guiding unit 110 includes slopes (S52). At least one surface of the refract guiding unit 110 according to an embodiment of the present invention has a slope inclined at a predetermined angle with respect to horizontal plane.

In addition, one side of the refract guiding unit 110 adjoining the light guiding unit is formed concavely for concentrating the total light input from the light source to guide the light to the light guiding unit 130.

The above-mentioned refract guiding unit 110 is formed between the light source and the light guiding unit 130, and concentrates total input to guide it to the light guiding unit 130 light by refracting at least a part of light input from the light source According to the surface lighting apparatus and the method for manufacturing the same, flexible surface lighting apparatus can be embodied.

Furthermore, the surface lighting apparatus is capable of securing productivity by wet coating performed on surfaces of the light guiding unit without additional adhesion layers and preventing glaring by emitting constant light amount from a different angle.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A surface lighting apparatus comprises:
   a first light guiding unit for dispersing input light from a light source through patterns formed in intaglio or relief in the first light guiding unit;
   a reflecting unit formed at a lower part of the first light guiding unit to reflect light being out among dispersed light of the first light guiding unit;
   a diffusing unit adjoining an upper part of the first light guiding unit and scattering light dispersed from the first light guiding unit in an upward direction; and
   a second light guiding unit formed between the light source and the first light guiding unit and guiding the input light from the light source to the first light guiding unit,
   wherein the second light guiding unit further comprises;
      a first portion including an inner surface that has a given slope and a first plurality of protrusions refracting a first part of the input light from the light source in a vertical direction, the first plurality of protrusions being formed on the inner surface;
      a second portion including a surface that is formed concavely in an inward direction toward the light source and formed adjacent to the first light guiding unit, the second portion guiding a second part of the input light from the light source directly to the first light guiding unit;
   a third portion including a surface that faces the diffusing unit and formed between the first portion and the second portion; and
      a fourth portion including a surface that faces the reflecting unit and a second plurality of protrusions disposed on a lower inner surface of the second light guiding unit, formed under the second portion, and guiding the vertically refracted light from the first plurality of protrusions of the first portion to the first light guiding unit by refracting the vertically refracted input light using the second plurality of protrusions.

2. The surface lighting apparatus according to claim 1, wherein the reflecting unit comprises:
   a catalyst layer formed using metallic salts; and
   a silver layer formed using silver injection and reduction liquid on one side of the catalyst layer.

3. The surface lighting apparatus according to claim 2, wherein the reflecting unit further comprises a primer layer for enhancing interfacial adhesion with the catalyst layer.

4. The surface lighting apparatus according to claim 3, wherein the primer layer is formed by silver mirror reaction on one side of the reflecting unit.

5. The surface lighting apparatus according to claim 3, wherein a thickness of the primer layer is thicker than a thickness of patterns of the first light guiding unit.

6. The surface lighting apparatus according to claim 1, wherein the diffusing unit comprises a diffusion coating layer of low refractive index for lowering refractive index using transparent polymer resin and inorganic substance of low refractive index to upward path of light radiated from the first light guiding unit.

7. The surface lighting apparatus according to claim 1, further comprising flexible printed circuit board (FPCB) with a light-source module adjoining one surface of the second light guiding unit to include a multiplicity of light sources.

8. The surface lighting apparatus according to claim 1, wherein the vertical direction being a direction substantially perpendicular to the lower inner surface.

9. The surface lighting apparatus according to claim 1, wherein the inner surface of the first portion of the second light guiding unit is a first surface, the surface of the second portion of the second light guiding unit is a second surface, and the lower inner surface of the second light guiding unit is a third surface, and
   wherein the second light guiding unit further includes a fourth surface receiving the input light from the light source, the third surface being adjacent to the light source and spaced apart from the second surface by a given distance in a horizontal direction that is perpendicular to the vertical direction.

10. The surface lighting apparatus according to claim 1, wherein the second light guiding unit further includes a top surface that adjoins the inner surface of the first portion with an angle in a range from 150° to 175° therebetween.

11. The surface lighting apparatus according to claim 1, wherein the diffusing unit and reflecting unit bonded without a separate adhesive layer.

12. A method for manufacturing a surface lighting apparatus comprises:
   forming a first light guiding unit for dispersing input light from a light source through patterns formed in intaglio or relief in the first light guiding unit;
   forming a reflecting unit formed at a lower part of the first light guiding unit to reflect light being out among dispersed light of the first light guiding unit;
   forming a diffusing unit adjoining an upper part of the first light guiding unit and scattering light dispersed from the first light guiding unit in an upward direction; and
   forming a second light guiding unit formed between the light source and the first light guiding unit and guiding the input light from the light source to the first light guiding unit,
   wherein the second light guiding unit comprises;
      a first portion including an inner surface that has a given slope and a first plurality of protrusions refracting a first part of the input light from the light source in a vertical direction, the first plurality of protrusions being formed on the inner surface;
      a second portion including a surface that is formed concavely in an inward direction toward the light source and formed adjacent to the first light guiding unit, the second portion guiding a second part of the input light from the light source directly to the first light guiding unit;
      a third portion including a surface that faces the diffusing unit and formed between the first portion and the second portion; and
      a fourth portion including a surface that faces the reflecting unit and a second plurality of protrusions disposed on a lower inner surface of the second light guiding unit, formed under the second portion, and guiding the vertically refracted light from the first plurality of protrusions of the first portion to the first light guiding unit by refracting the vertically refracted input light using the second plurality of protrusions.

13. The method according to claim 12, wherein forming the reflecting unit comprises:
   forming a catalyst layer formed using metallic salts; and
   forming a silver layer formed using silver injection and reduction liquid on one side of the catalyst layer.

14. The method according to claim 13, wherein forming the reflecting unit further comprises forming a primer layer for enhancing interfacial adhesion with the catalyst layer.

15. The method according to claim 12, further comprising forming FPCB with a light-source module adjoining one surface of the second light guiding unit to include a multiplicity of light sources.

16. The method according to claim 12, wherein the diffusing unit and reflecting unit are bonded without a separate adhesive layer.

* * * * *